United States Patent Office 3,138,564
Patented June 23, 1964

3,138,564
PROCESS FOR GRAFTING A MONOMER ONTO AN OXIDIZED POLYSACCHARIDE
Jules Borunsky, Sarnia, Ontario, Canada, assignor to Polymer Corporation Limited, Sarnia, Ontario, Canada, a corporation of Canada
No Drawing. Filed Oct. 31, 1955, Ser. No. 544,023
Claims priority, application Canada Sept. 21, 1955
10 Claims. (Cl. 260—17)

This invention relates to the grafting of polymerizable compounds on to pre-formed naturally occurring polymers. By "grafting" is means the addition of the polymerizable compounds as branches to the previously formed long-chain molecules of said polymer. The invention is more particularly concerned with such pre-formed naturally occurring polymers which are at least partially water soluble although water insoluble naturally occurring polymers may also be used.

It is known that the properties of polymeric materials depend directly on the kind of molecules which make up the polymeric structure on the number of molecular units joined together in this structure, and on the manner in which such monomeric units are joined. It has been theorized that, if one or more monomeric materials could be added as branches to this initially formed polymer, the properties of the polymer could be modified as desired. The resultant polymer would be much more useful and would have predetermined characteristics.

The primary object of this invention is to provide a process for grafting polymerizable compounds on to pre-formed naturally occurring polymers. Another object of the present invention is to provide a process for such grafting in which the polymer itself initiates the reaction.

These and other objects of the invention are attained by the process for grafting a polymerizable compound on to a pre-formed naturally occurring polymer which comprises oxidizing said polymer and subsequently polymerizing the oxidized polymer with said polymerizable compound.

In a suitable method according to the present invention, the naturally occurring polymeric substance is oxidized by passing an oxidizing gas, such as ozone, or ozone-containing gas such as ozone-containing oxygen, through a solution or dispersion of said polymeric substance in water. The degree of oxidation may be varied depending on the activity desired for the grafting operation. In general a minimum of 1.0 part by weight of oxidizing gas should be used to treat every 100 parts by weight of polymeric material, although, this minimum may be exceeded, depending, of course, on the activity desired for the grafting operation. After the required amount of oxidation has taken place, the excess oxidizing gas, which would inhibit subsequent polymerization, is flushed out with nitrogen or other non-reactive gas. The polymerizable compound, generally in the form of the monomer, which is to be grafted is next added along with additional polymerization ingredients. These ingredients normally include a modifier and an emulsifier. Although no further addition of activator or initiator is necessary, as the oxidized naturally occurring polymer now performs these functions, further activator may be added if the polymerization reaction is to be speeded up. The grafting polymerization is allowed to proceed to the desired conversion and then is stopped by means of a suitable stopper well known in the art. The product is then recovered by any conventional method, also well known in the art.

The naturally occurring polymers or their derivatives which may serve as the base material on to which further polymerizable material is to be grafted should be at least partially water soluble to obtain the best results. Typical compounds, suitable for use in carrying out this invention, include: casein, starch, gelatine, pectin, carboxymethyl-cellulose and alginates. In addition, substantially water insoluble naturally occurring polymers such as cellulose may be used when dispersed, in a finely divided state, in water.

Suitable polymerizable compounds for use as monomers according to the method of the present invention are unsaturated organic compounds containing the $CH_2=C<$ group. Such compounds contain a terminal methylene group attached by a double bond to a carbon atom and undergo addition polymerization to produce polymers which are predominantly linear in character. Included among these materials are the conjugated open-chain dienes such as butadiene-1,3, 2,3-dimethylbutadiene-1,3, isoprene, chloroprene, piperylene and the like; compounds containing a $CH_2=C<$ group and copolymerizable with the dienes such as styrene, chlorostyrene, α-methyl styrene and the like; acrylic and methacrylic acids and their esters, nitriles and amides such as acrylic acid, acrylonitrile, methyl acrylate, methyl methacrylate, butyl acrylate, methacrylamide; and other vinyl compounds such as divinyl benzene, vinyl ethers, vinyl ketones and the like; vinylidene compounds such as vinylidene chloride; trienes such as myrcene; compounds containing both olefinic and acetylenic bonds such as vinyl acetylene; and mixtures of these compounds.

Emulsion recipes suitable for the grafting operation usually contain water as the non-reactive medium. In addition they normally contain emulsifiers, for example, natural emulsifiers such as alkali metal salts of fatty acids, rosin acids or synthetic emulsifiers such as alkyl aryl sulfonates, alkyl sulfates and ethylene oxide condensates; modifiers, such as for example mercaptans; and initiator-activator systems such as, for example peroxy compounds and redox systems. The following formulae are typical recipes by which the grafting operation of the present invention may be carried out. The figures are given in parts by weight.

Formula I:
| | |
|---|---|
| Monomer | 100 |
| Oxidized polymer (dry basis) | 100 |
| Water | 200 |
| Primary dodecyl mercaptan | 0.50 |
| Emulsifier | 4.0 |

Formula II:
| | |
|---|---|
| Monomer | 100 |
| Oxidized polymer (dry basis) | 25 |
| Water | 250 |
| Emulsifier | 5.0 |
| Mixed tertiary mercaptan ($C_{12}$:$C_{14}$:$C_{16}$::3:1:1) | 0.30 |
| Activator: | |
|   Sodium formaldehyde sulfoxylate | 0.050 |
|   $FeSO_4 \cdot 7H_2O$ | 0.009 |
|   Ethylenediamine tetraacetic acid | 0.010 |
|   NaOH (50% solution) | 0.010 |
|   Water | 4.5 |

Formula III:
| | |
|---|---|
| Monomer | 100 |
| Oxidized polymer (dry basis) | 150 |
| Water | 450 |
| Diazothioether, e.g. 2-(4-methoxybenzenediaxomercapto)-naphthalene | 0.20 |
| Mixed tertiary mercaptan $C_{12}$:$C_{14}$:$C_{16}$::3:1:1) | 0.35 |
| Emulsifier | 5.0 |

Formula IV:
- Monomer _____ 100
- Oxidized polymer (dry basis) _____ 200
- Water _____ 800
- Tetraethylene pentamine _____ 0.40
- Mixed tertiary mercaptan
  ($C_{12}$:$C_{14}$:$C_{16}$::3:1:1) _____ 0.40
- KCl _____ 0.80
- KOH _____ 0.10
- Emulsifier _____ 5.0

The ozone which was used as the oxidizing gas in one embodiment of the present examples was manufactured as follows, although it is to be understood that ozone prepared in any other manner can also be used:

Oxygen was subjected to a silent electrical discharge in a glass tube to convert it partially to ozone. A glass tube was built with a glass rod, wound with platinum wire, through the center. The tube was sealed at both extremities, the ends of the platinum wire being sealed in with the glass rod. An orifice was provided at each end of the tube for the circulation of oxygen. The entire outer surface of the tube between the orifices was covered with a thin aluminum foil. This aluminum foil, along with one end of the platinum wire, was connected to a 10,000 volt transformer regulated by a 115 volt variac. A silent discharge resulted when contact through the transformer was made between the aluminum foil and the platinum wire. A stream of dry oxygen, after being passed through the glass tube under slight pressure and subjected to the discharge, contained approximately 1–2% ozone. Such ozone-containing oxygen is herein termed "ozonized oxygen." The following examples are given to illustrate the invention:

EXAMPLE I

*Grafting (Butadiene-1,3) Acrylonitrile on Oxidized Carboxymethylcellulose*

15 liters of ozonized oxygen were bubbled through 500 grams of a 5% solution of carboxymethylcellulose in water, following which nitrogen was bubbled through the solution for 10 minutes to remove any free oxygen and unreacted ozone.

450.0 grams of a solution prepared in this way were charged into each of four 32-ounce polymerization bottles. To each bottle were also added:

| | |
|---|---:|
| Monomer _____grams__ | 90.0 |
| Emulsifier solution _____do____ | 28.1 |
| Modifier solution _____mls__ | 4.5 |
| Activator solution _____mls__ | 6.75 |

The emulsifier solution was prepared by dissolving 40.0 grams of Nacconal NRSF in 160 grams of water. (Nacconal NRSF is a sodium alkyl aryl sulfonate.)

The modifier solution was prepared by dissolving 2.5 grams of a mixed tertiary mercaptan

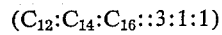
($C_{12}$:$C_{14}$:$C_{16}$::3:1:1)

in about 30 mls. of benzene and making up to 50.0 mls. with benzene.

The activator solution was prepared by dissolving the following in 100.0 mls. of water:

| | Grams |
|---|---:|
| Sodium formaldehyde sulfoxylate _____ | 1.140 |
| $FeSO_4 \cdot 7H_2O$ _____ | 0.200 |
| Ethylenediaminetetraacetic acid _____ | 0.240 |
| NaOH (50% solution) _____ | 0.240 |

The bottles were capped and polymerized at 50° C. for 41 hours. The percent solids was determined on each bottle after which the latex in each bottle was coagulated with alcohol and the coagulum dried in vacuum at 50° C. The percent bound acrylonitrile was determined on each dried sample.

The results are summarized in Table I.

TABLE I

| Bottle | 1 | 2 | 3 | 4 |
|---|---|---|---|---|
| Butadiene-1,3 (grams) | 36.0 | 36.0 | 45.0 | 45.0 |
| Acrylonitrile (grams) | 54.0 | 54.0 | 45.0 | 45.0 |
| Percent solids | 13.5 | 14.6 | 15.7 | 14.4 |
| Percent conversion of added monomers | 55.0 | 62.1 | 69.0 | 60.9 |
| Percent Bound Acrylonitrile | 29.6 | 34.1 | 30.1 | 34.4 |

These results indicate that carboxymethylcellulose oxidized with ozonized oxygen is capable of initiating polymerization and serving as the basic polymer for a graft of butadiene and acrylonitrile.

EXAMPLE II

*Grafting Various Monomers on Oxidized Carboxymethylcellulose*

11.4 liters of ozonized oxygen were bubbled through 450 grams of a 5% solution of carboxymethylcellulose in water, following which nitrogen was bubbled through the solution for 10 minutes to remove any free oxygen or unreacted ozone.

100.0 grams of this solution were charged into each of four 7-ounce polymerization bottles. To each bottle were also added:

| | |
|---|---|
| Monomer _____ | 20.0 grams. |
| Emulsifier solution _____ | 6.25 grams. |
| Modifier solution _____ | 1.0 ml. |
| Activator solution _____ | varied (see table II). |

The emulsifier, modifier and activator solutions were prapered as described in Example I.

The percent solids was determined on each bottle after 40 hours reaction at 50° C.

TABLE II

| Bottle | 1 | 2 | 3 | 4 |
|---|---|---|---|---|
| Butadiene-1,3 (grams) | 20.0 | 10.0 | 10.0 | 10.0 |
| Styrene (grams) |  | 10.0 |  |  |
| Acrylonitrile (grams) |  |  | 10.0 | 10.0 |
| Activator (mls.) | 1.5 | 1.5 | 1.5 | 2.0 |
| Percent solids | 13.0 | 15.5 | 18.1 | 15.5 |

These results indicate that butadiene-1,3, either alone or with styrene may be grafted on to the carboxymethylcellulose oxidized with ozonized oxygen.

EXAMPLE III

*Grafting Various Proportions of Butadiene-1,3 and Acrylonitrile on Oxidized Carboxymethylcellulose*

14.2 liters of ozonized oxygen were bubbled through 500 grams of a 5% solution of carboxymethylcellulose in water, following which nitrogen was bubbled through the solution for 10 minutes to remove any free oxygen or unreacted ozone.

100.0 grams of a solution prepared in this manner were charged into each of nine 7-ounce polymerization bottles. To each bottle were also added:

| | | |
|---|---|---:|
| Monomer _____ | grams__ | 20.0 |
| Emulsifier solution _____ | do____ | 6.25 |
| Modifier solution _____ | ml__ | 1.0 |
| Activator solution _____ | mls__ | 1.5 |

The emulsifier, modifier and activator solutions were prepared as described in Example I.

The percent solids was determined on each bottle after 40 hours reaction at 50° C.

TABLE III

| Bottle | 1 | 2 | 3 | 4 | 5 | 6 | 7 | 8 | 9 |
|---|---|---|---|---|---|---|---|---|---|
| Butadiene-1,3 | 2 | 4 | 6 | 8 | 10 | 12 | 14 | 16 | 18 |
| Acrylonitrile | 18 | 16 | 14 | 12 | 10 | 8 | 6 | 4 | 2 |
| Percent solids | 6.0 | 9.4 | 16.5 | 20.2 | 20.0 | 19.5 | 19.3 | 17.1 | 15.0 |

These results indicate that various proportions of butadiene-1,3 and acrylonitrile may be grafted on to carboxymethylcellulose oxidized with ozonized oxygen.

EXAMPLE IV

*Grafting Styrene on Oxidized Carboxymethylcellulose*

8.5 liters of ozonized oxygen were bubbled through 500 grams of a 7% solution of carboxymethylcellulose in water, following which nitrogen was bubbled through the solution for 10 minutes to remove any free oxygen or unreacted ozone.

100.0 grams of this solution were charged into each of three 7-ounce polymerization bottles. To each bottle were also added:

Styrene monomer _____grams__ 28.0
Emulsifier solution _____do____ 7.0
Modifier solution _____mls__ 2.0
Activator solution _____mls__ 1.5

The activator solution was prepared as in Example I.

The modifier solution contained 0.036 gram of mixed tertiary mercaptan dissolved in every 2.0 mls. of benzene solution.

Two emulsifier solutions were used. The first (Emulsifier #1) was a 20% solution of Nacconal NRSF in water prepared as in Example I. The second (Emulsifier #2) was prepared by dissolving the following in about 75 mls. of water and making the whole up to 123.5 grams with water:

Dresinate 214 (87% solids) _____grams__ 23.5
Daxad 11 _____do____ 0.5
Trisodium phosphate _____do____ 2.5
KCl _____do____ 1.25

(Dresinate 214 is a potassium base rosin soap.)

Daxad 11 is the sodium salt of beta-naphthalene-sulfonic acid condensed with formaldehyde.)

The percent solids was determined on each bottle after polymerization at 50° C. for 41 hours.

TABLE IV

| Bottle | 1 | 2 | 3 |
|---|---|---|---|
| Emulsifier #1 (grams) | 7.0 | | |
| Emulsifier #2 (grams) | | 7.0 | 7.0 |
| Percent Solids | 21.0 | 11.0 | 13.0 |

These results indicate that styrene is a suitable monomer and that various emulsifiers may be used in the grafting of styrene on to carboxymethyl-cellulose oxidized with ozonized oxygen.

EXAMPLE V

*Grafting Butadiene-1,3 and Styrene on Oxidized Carboxymethylcellulose*

11.4 liters of oxygen only were bubbled through 450 grams of a 5% solution of carboxymethylcellulose in water, following which nitrogen was bubbled through the solution for 10 minutes to remove any free oxygen.

100.00 grams of a solution prepared in this manner were charged into each of five 7-ounce polymerization bottles. To each bottle were also added:

Monomer _____grams__ 20.0
Emulsifier solution _____do____ 6.25
Modifier solution _____ml__ 0.5
Activator solution _____mls__ 1.5

The emulsifier, modifier and activator solutions were prepared as described in Example I.

The percent solids was determined on each bottle after 20 hours reaction at 50° C.

TABLE V

| Bottle | 1 | 2 | 3 | 4 | 5 |
|---|---|---|---|---|---|
| Butadiene-1,3 (grams) | 20.0 | 20.0 | | | 10.0 |
| Styrene (grams) | | | 20.0 | 20.0 | 10.0 |
| Percent Solids | 15.3 | 16.4 | 18.8 | 19.2 | 18.3 |

These results indicate that butadiene-1,3 alone, styrene alone, or a mixture of butadiene-1,3 and styrene may be grafted on to carboxymethylcellulose oxidized with oxygen alone.

EXAMPLE VI

*Grafting Various Monomers on Oxidized Casein*

8.55 liters of ozonized oxygen were bubbled through 450 grams of a 5% solution of casein in water, following which nitrogen was bubbled through the solution for 10 minutes to remove any free oxygen or unreacted ozone.

100.0 grams of a solution prepared in this manner were charged into each of seven 7-ounce polymerization bottles. To each bottle were also added:

Monomer _____grams__ 20.0
Modifier solution _____ml__ 0.5
Activator solution _____mls__ 1.5

Emulsifier solution was prepared as described in Example I and was added only to bottles 1, 2, 3 and 4. Bottles 5, 6 and 7 contained no added emulsifier.

The modifier solution contained 0.10 gram of mixed tertiary mercaptan for every 1.0 ml. of benzene solution.

The activator solution was prepared as described in Example I.

Percent solids was determined after 16 and 40 hours reaction at 50° C.

TABLE VI

| Bottle | 1 | 2 | 3 | 4 | 5 | 6 | 7 |
|---|---|---|---|---|---|---|---|
| Butadiene-1,3 (grams) | 20.0 | | | 10.0 | 20.0 | | |
| Styrene (grams) | | 20.0 | | 10.0 | | 20.0 | |
| Acrylamide (grams) | | | 20.0 | | | | 20.0 |
| Emulsifier (grams) | 6.25 | 6.25 | 6.25 | 6.25 | | | |
| Percent Solids—16 hrs | 6.8 | 15.4 | (¹) | 8.7 | | 6.3 | |
| Percent Solids—40 hrs | 8.3 | 14.4 | (¹) | 9.6 | 5.9 | 6.3 | 11.2 |

¹ Solid mass.

These results indicate that casein, oxidized with ozonized oxygen, is capable of initiating polymerization and serving as the basic polymer in the grafting of the various monomers thereto.

EXAMPLE VII

*Grafting Various Monomers on Oxidized Casein*

8.55 liters of oxygen only were bubbled through 450 grams of a 5% solution of casein in water, following which nitrogen was bubbled through the solution for 10 minutes to remove any free oxygen.

100.0 grams of a solution prepared in this manner were charged into each of eight 7-ounce polymerization bottles. To each bottle were also added:

Monomer _____grams__ 20.0
Emulsifier solution _____do____ 6.2
Modifier solution _____ml__ 0.5
Activator solution _____mls__ 1.5

The emulsifier solution was prepared as described in Example IV, Emulsifier Solution #2.

The modifier solution contained 0.10 gram of mixed tertiary mercaptan for every 1.0 ml. of benzene solution.

The activator was prepared as described in Example I.

The percent solids was determined on each bottle after 65 hours reaction at 50° C.

TABLE VII

| Bottle | 1 | 2 | 3 | 4 | 5 | 6 | 7 | 8 |
|---|---|---|---|---|---|---|---|---|
| Butadiene-1,3 (grams) | 20.0 | | | 10.0 | 20.0 | | | 10.0 |
| Styrene (grams) | | 20.0 | | 10.0 | | 20.0 | | 10.0 |
| Acrylamide (grams) | | | 20.0 | | | | 20.0 | |
| Percent Solids | 5.1 | 18.3 | 8.6 | 7.3 | 4.2 | 8.2 | 5.2 | 5.7 |

These results indicate that oxygen alone may be used as the oxidizing agent for the casein which is to be used as the basic polymer in the grafting of various monomers thereto.

EXAMPLE VIII

*Grafting Butadiene-1,3, Styrene and Acrylonitrile on Oxidized Gelatin*

8.55 liters of an oxidizing gas were bubbled through 410 grams of a 10% gelatin solution in water. In one case ozonized oxygen was used as the oxidizing gas while in the second case oxygen only was used. Each solution was treated for 10 minutes with nitrogen in order to remove any free oxygen or unreacted ozone.

90.0 grams of the oxidized gelatin solution were charged into each of eight 7-ounce polymerization bottles. The gelatin solution oxidized with oxygen only was charged into bottles 1, 2, 3 and 4, while the gelatin solution oxidized with ozonized oxygen was charged into bottles 5, 6, 7 and 8. To each bottle were also added:

Monomer _____grams__ 26.0
Emulsifier solution _____do____ 11.0
Modifier solution _____ml__ 1.0
Activator solution _____mls__ 1.5

Emulsifier solution #1 was prepared as described in Example I while emulsifier solution #2 was prepared as described in Example IV.

The modifier solution contained 0.10 gram of mixed tertiary mercaptan for every 1.0 ml. of benzene solution.

The activator was prepared as described in Example I.

The percent solids was determined on the bottles at various times after polymerization at 50° C.

TABLE VIII

| Bottle | 1 | 2 | 3 | 4 | 5 | 6 | 7 | 8 |
|---|---|---|---|---|---|---|---|---|
| Butadiene-1,3 (grams) | 18.0 | 18.0 | 11.0 | 11.0 | 18.0 | 18.0 | 11.0 | 11.0 |
| Styrene (grams) | | | 25.0 | 25.0 | | | 25.0 | 25.0 |
| Acrylonitrile (grams) | 18.0 | 18.0 | | | 18.0 | 18.0 | | |
| Emulsifier #1 | X | | X | | X | | X | |
| Emulsifier #2 | | X | | X | | X | | X |
| Ozonized oxygen | | | | | X | X | X | X |
| Oxygen | X | X | X | X | | | | |
| Percent Solids—17 hrs | 0 | 0 | 14.0 | 15.0 | | 13.0 | | (²) |
| Percent Solids—89 hrs | 9.0 | 10.2 | 15.0 | 17.2 | 14.0 | (¹) | 14.3 | (²) |

¹ Solid mass.
² Bottle broke.

These results indicate that gelatin oxidized either with ozonized oxygen or with oxygen alone may be used to catalyze polymerization and to receive a graft of various monomers.

EXAMPLE IX

*Grafting Butadiene-1,3 Styrene and Acrylonitrile on Oxidized Starch*

8.55 liters of an oxidizing gas were bubbled through 410 grams of a 10% starch solution in water. In one case ozonized oxygen was used as the oxidizing gas while in the second case oxygen only was used. Each solution was treated for 10 minutes with nitrogen in order to remove any free oxygen or unreacted ozone.

90.0 grams of the oxidized starch solution were charged into each of five-ounce polymerization bottles. The starch solution oxidized with oxygen only was charged into bottles 1 and 2 while the starch solution oxidized with ozonized oxygen was charged into bottles 3, 4 and 5. To each bottle were also added:

Monomer _____grams__ 36.0
Emulsifier solution _____do___ 11.0
Modifier solution _____ml__ 1.0
Activator solution _____mls__ 1.5

The emulsifier, modifier and activator solutions were the same as those used in Example XI.

The percent solids was determined on each bottle after 17 and 89 hours polymerization at 50° C.

TABLE IX

| Bottle | 1 | 2 | 3 | 4 | 5 |
|---|---|---|---|---|---|
| Butadiene-1,3 (grams) | 18.0 | 11.0 | 18.0 | 11.0 | 11.0 |
| Styrene (grams) | | 25.0 | | 25.0 | 25.0 |
| Acrylonitrile (grams) | 18.0 | | 18.0 | | |
| Emulsifier #1 | X | X | X | X | |
| Emulsifier #2 | | | | | X |
| Ozonized oxygen | | | X | X | X |
| Oxygen | X | X | | | |
| Percent Solids—17 hrs | 8.5 | 17.5 | 15.0 | 25.0 | 15.1 |
| Percent Solids—89 hrs | 12.2 | 26.8 | 19.6 | 26.2 | 15.1 |

These results indicate that starch oxidized either with ozonized oxygen or with oxygen alone may be used to catalyze polymerization and to receive a graft of various monomers.

EXAMPLE X

*Grafting Various Monomers on Cellulose*

7.4 grams of finely divided pure cellulose were dispersed in water and the whole was made up to 420 grams with water. 24.0 liters of ozonized oxygen were bubbled through this dispersion under agitation, following which nitrogen was bubbled through the dispersion for 10 minutes to remove any free oxygen or unreacted zone.

100.0 grams of this dispersion were charged into each of four 7-ounce polymerization bottles. To each bottle were also added:

Monomer _____grams__ 20.0
Emulsifier solution _____do____ 6.25
Modifier solution _____ml__ 1.0
Activator solution _____mls__ 1.5

The emulsifier, modifier and activator solutions were prepared as described in Example I.

After 41 hours polymerization at 50° C. the contents of each bottle were coagulated with ethanol and dried under vacuum at room temperature over calcium chloride for 48 hours.

The following table summarizes the results:

TABLE X

| Bottle | 1 | 2 | 3 | 4 |
|---|---|---|---|---|
| Styrene (grams) | 20.0 | | | 10.0 |
| Acrylonitrile (grams) | | 10.0 | 10.0 | |
| Butadiene-1,3 (grams) | | 10.0 | 10.0 | 10.0 |
| Total Solids (grams) | 18.8 | 17.5 | 18.0 | 17.6 |
| Percent Conversion | 84.8 | 78.2 | 80.8 | 78.8 |

These results indicate that cellulose, when oxidized in dispersed form, with ozonized oxygen, may be used to initiate polymerization, and to form the basic polymer on to which various monomers may graft.

What I claim is:

1. A process for grafting a polymerizable monomer containing a $CH_2=C<$ group on to a polysaccharide, which process comprises forming an aqueous dispersion of said polysaccharide, oxidizing said polysaccharide in aqueous dispersion solely with an oxidizing gas selected from the group consisting of oxygen and ozone, dispersing said monomer in the treated aqueous dispersion of polysaccharide and maintaining the monomer dispersed therein while the grafting polymerization takes place.

2. A process for grafting a polymerizable monomer containing a $CH_2=C<$ group on to a polysaccharide, which process comprises forming an aqueous dispersion of the polysaccharide, oxidizing said polysaccharide in aqueous dispersion solely with an ozone-containing gas, dispersing said monomer in the ozone-treated aqueous dispersion of polysaccharide and maintaining the monomer dispersed therein while the grafting polymerization takes place.

3. A process for grafting a polymerizable monomer containing a $CH_2=C<$ group on to a polysaccharide, which process comprises forming an aqueous dispersion of said polysaccharide, oxidizing said polysaccharide in aqueous dispersion solely with at least 0.01 part by weight of ozone per 100 parts by weight of said polysaccharide, dispersing said monomer in said ozone-treated aqueous dispersion of polysaccharide and maintaining the monomer dispersed therein while the grafting polymerization takes place.

4. A process for grafting a polymerizable monomer containing a $CH_2=C<$ group on to a polysaccharide, which process comprises forming an aqueous dispersion of said polysaccharide, oxidizing said polysaccharide in aqueous dispersion solely with at least 0.01 part by weight of oxygen per 100 parts by weight of said polysaccharide, dispersing said monomer in said oxygen-treated aqueous dispersion of polysaccharide and maintaining the monomer dispersed therein while the grafting polymerization takes place.

5. A process for grafting a polymerizable monomer containing a $CH_2=C<$ group on to a polysaccharide, which process comprises forming an aqueous dispersion of said polysaccharide, oxidizing said polysaccharide in aqueous dispersion solely with an ozone-containing gas, removing excess ozone-containing gas by flushing said ozone-treated aqueous dispersion with a non-reactive gas, dispersing said monomer in said ozone-treated aqueous dispersion of polysaccharide, and maintaining said monomer dispersed therein while the grafting polymerization takes place.

6. A process for grafting a polymerizable monomer containing a $CH_2=C<$ group on to a polysaccharide, which process comprises forming an aqueous dispersion of said polysaccharide, oxidizing said polysaccharide in aqueous dispersion solely with ozone-containing oxygen, removing excess ozone-containing oxygen by flushing the oxidized aqueous dipsersion with a non-reactive gas, dispersing said monomer in the oxidized aqueous dispersion of polysaccharide and maintaining said monomer dispersed therein while the grafting polymerization takes place.

7. A process for grafting a polymerizable monomer containing a $CH_2=C<$ group on to a polysaccharide, which process comprises forming an aqueous dispersion of said polysaccharide, oxidizing said polysaccharide in aqueous dispersion solely with an oxygen-containing gas in which oxygen is the sole oxidizing agent, removing excess oxygen-containing gas by flushing the oxidized aqueous dispersion with a non-reactive gas, dispersing said monomer in the oxidized aqueous dispersion of polysaccharide and maintaining the monomer dispersed therein while the grafting polymerization takes place.

8. The process as claimed in claim 1 wherein the polysaccharide is selected from the group consisting of starch, pectin, carboxymethylcellulose, alginate, and cellulose.

9. The process as claimed in claim 8 in which said polymerizable compound is selected from the group consisting of butadiene-1,3, styrene, acrylonitrile, methyl methacrylate, and acrylamide.

10. The process as claimed in claim 1 in which said polymerizable compound is selected from the group consisting of butadiene-1,3, styrene, acrylonitrile, methyl methacrylate, and acrylamide.

References Cited in the file of this patent

UNITED STATES PATENTS

| | | |
|---|---|---|
| 2,115,705 | Busse | May 3, 1938 |
| 2,388,905 | Compagnon et al. | Nov. 13, 1945 |
| 2,763,625 | Illingsworth et al. | Sept. 18, 1956 |

FOREIGN PATENTS

| | | |
|---|---|---|
| 573,062 | Great Britain | Nov. 5, 1945 |
| 589,802 | Great Britain | July 1, 1947 |
| 1,101,682 | France | Apr. 27, 1955 |
| 499,577 | Canada | Jan. 26, 1954 |
| 733,093 | Great Britain | July 6, 1955 |

OTHER REFERENCES

Whitby: Ind. Eng. Chem., vol. 47, April 1955, page 815.

Valentine: "Block and Graft Copolymers," Fibres (Natural and Synthetic), February 1955, pages 60–63.

British Rubber Producers Research Association Technical Bulletin No. 1 (undated but, referred to in the Valentine publication, above).

Hill: "Chemistry and Industry," Sept. 4, 1954, pages 1086–1087.